United States Patent [19]
Berry

[11] Patent Number: 5,462,723
[45] Date of Patent: Oct. 31, 1995

[54] AQUEOUS HYDRIDES AND METHOD OF MANUFACTURE THEREFORE

[75] Inventor: William W. Berry, Lakeland, Fla.

[73] Assignee: Coralplex, Inc., Dallas, Tex.

[21] Appl. No.: 391,489

[22] Filed: Feb. 21, 1995

Related U.S. Application Data

[63] Continuation of Ser. No. 131,785, Oct. 1, 1993, abandoned.

[51] Int. Cl.$^6$ ................................ C01B 6/00; C01B 33/04
[52] U.S. Cl. ............................................. 423/347; 423/645
[58] Field of Search ...................................... 423/347, 645

[56] References Cited

U.S. PATENT DOCUMENTS 4,029,747  6/1977  Merkl .
4,570,713  2/1986  Rice .
4,571,328  2/1986  Rice .

*Primary Examiner*—Wayne Langel
*Attorney, Agent, or Firm*—David H. Judson

[57] ABSTRACT

Aqueous hydrides including a metal, a metal hydroxide and water and a method of manufacture therefor are provided. The method includes a reaction which does not require precise stoichiometric proportions of metal, alkali hydroxide and water. The specific gravity of the reaction mixture is monitored and adjusted where appropriate during the reaction process. Temperature and rate of reaction are controlled to prevent formation of silicates. Aqueous by, rises produced in accordance with the invention exhibit polymer characteristics and are suitable for use as coatings, reducing viscosity, sequestering agents, emulsion agents, surfactants, detergents and the like.

12 Claims, 1 Drawing Sheet

AQUEOUS HYDRIDES AND METHOD OF MANUFACTURE THEREFORE

This is a continuation of application Ser. No. 08/131,785 filed on Oct. 1, 1993, abandoned.

TECHNICAL FIELD

The present invention relates generally to a method for manufacturing aqueous hydrides. More specifically, the invention relates to a batch continuous process for manufacturing aqueous hydrides having improved stability in alkaline solution and which do not require precise stoichiometric proportions of the materials used in the manufacture therefor.

BACKGROUND OF THE INVENTION

Silicon is well known in the art for providing an effective coating for use with a variety of applications. For example, silicon is often used to coat metals, thereby reducing corrosion of the metal. One of the disadvantages associated with the use of silicon as a coating has been the difficulty of providing silicon in an aqueous medium. This is in part due to silicon being insoluble in water.

However, silicon is soluble in alkalis. Several attempts have been made to combine silicon or other metals in an aqueous solution, to provide a plating bath having a source of silicon or other metals for deposition on a substrate or the like. For example, U.S. Pat. No. 4,571,328 to Rice relates to one such combination. As discussed in U.S. Pat. No. 4,571,328, previous methods for electrolytic deposition were difficult and inefficient since operations at high temperatures or closed, inert atmospheres were often required. Additionally, silicon hydrides were also unexpected in the aqueous form.

While the aqueous electrodeposition baths produced in accordance with U.S. Pat. No. 4,571,328 alleviate many of the problems associated with prior art techniques, the described hydrides are produced according to certain stoichiometric proportions of metal, alkaline metal hydroxide and water. For example, one embodiment teaches the formation of an aqueous hydride from the combination of silicon, sodium hydroxide and water in the ratio of 6:1:10 respectively by mole percent. While the resulting hydrides have proven successful, the manufacturing process is complex due to the desirability of manufacturing according to the specific ratios.

U.S. Pat. No. 4,570,713, also to Rice, relates to aqueous silicon compounds for use with oil recovery methods. As with U.S. Pat. No. 4,571,328, this patent teaches the formation of a metal hydride from reacting a non-alkaline metal with an alkaline metal hydroxide in water. The metal hydride is water-soluble and may be diluted. The solution is then used as a plating bath and electroplated onto a cathode. However, this patent also describes the combination of certain stoichiometric amounts of metal, alkaline metal hydroxide and water in a preselected mole percent to produce the desired metal hydride.

It is also known in the art that polysilicates exhibit polymer characteristics. For example, these compounds are suitable for use as detergents, coatings, to reduce viscosity and pressure differential. Additionally, these compounds act as sequestering agents by maintaining compounds in suspension. They are also suitable for use as surfactants and emulsion agents. However, it is further known in the art that the production of stable polysilicates and the maintenance thereof in solution is difficult. This has been due in part to hydrolysis reactions occurring, causing polysilicates to form ortho silicates which precipitate out of solution and/or exhibit substantially lower detergent characteristics. Consequently, such compounds manufactured in accordance with the prior art techniques have a short shelf life. This is particularly undesirable since ortho silicates do not exhibit the characteristics of polysilicates.

It would therefore be desirable to provide a method of manufacturing aqueous hydrides or polysilicates that are stable in an alkali solution.

BRIEF SUMMARY OF THE INVENTION

It is thus an object of the present invention to provide improved aqueous hydrides suitable for use in various applications.

It is another object of the present invention to provide a method of manufacturing aqueous hydrides.

It is a further object of the present invention to provide a method of manufacturing aqueous hydrides using a batch continuous process.

It is a further object of the present invention to provide a method of manufacturing aqueous hydrides which have improved stability in solution and which are less susceptible to hydrolysis.

It is yet a further object of the present invention to provide a method of manufacturing aqueous hydrides which possess polymer characteristics.

It is still a further object of the present invention to provide a method of manufacturing aqueous hydrides which does not require precise stoichiometric proportions of metal, alkaline metal hydroxide and water.

These and other objects of the invention are provided in a method of manufacturing which is controlled by a variety of factors such as temperature control, intimate contact between the water and the metal, monitoring the specific gravity of the reaction mixture and the like.

Various metals may be used in accordance with the invention so long as the metal is capable of reacting with a caustic. For example, silicon, zinc, aluminum, beryllium, tin, iron and other similar metals which are not corrosion resistant may be used. Various caustics, such as sodium hydroxide, potassium hydroxide and lithium hydroxide, may also be used in accordance with the present invention. In a preferred embodiment, the metal is silicon and the caustic is sodium hydroxide.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the drawings.

DETAILED DESCRIPTION

As discussed in U.S. Pat. No. 4,571,328, it is known that an excess of metal is less likely to affect the reaction than an excess of water or aqueous hydroxide. It is also known in the formation of aqueous hydrides containing silicon that an excess amount of water will result in the formation of ortho silicates. It has now been discovered that by utilizing an excess of metal in the presence of water and caustic under controlled reaction conditions, stable aqueous hydrides or polysilicates which exhibit the polymer characteristics discussed above may be formed.

Figure 1:
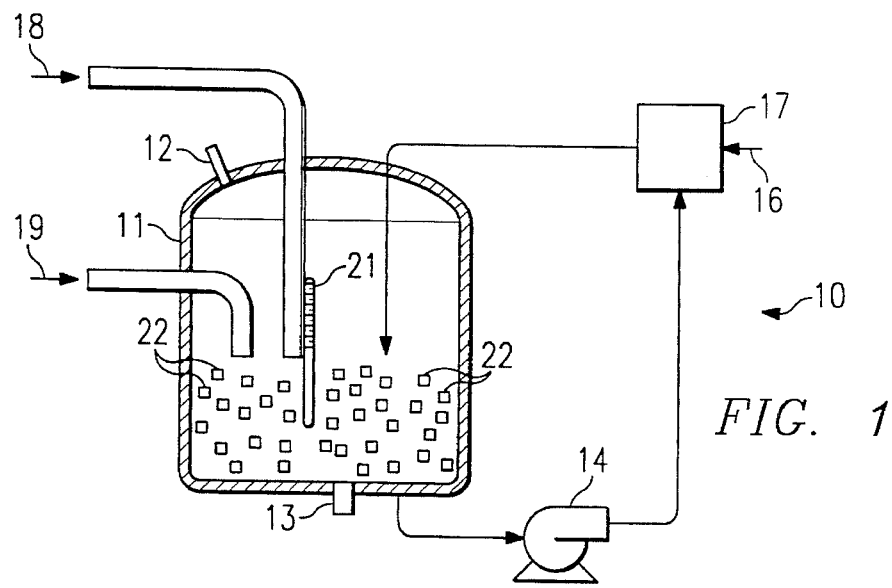
FIG. 1 illustrates apparatus having metal pieces contained therein which is suitable for use in accordance with the present invention.

FIG. 1 illustrates an apparatus system 10 which is suitable for use in accordance with the present invention. As shown in FIG. 1, a circulating reactor with a false bottom tank 11 is used in accordance with the invention. Preferably, the tank has a capacity of approximately 2000 gallons, but the ultimate size will depend on the desired product quantities. An opening 12 in the tank 11 allows for release of steam during the reaction. While the opening 12 illustrated in FIG. 1 is positioned at the top of tank 11, it should be noted that such positioning is not critical. Tank 11 also has an opening or drain 13 positioned at the bottom of the tank. Drain 13 allows for the reaction product to be separated from any unreacted materials upon completion of the process.

The apparatus used in accordance with the present invention also includes pump 14, mixer 16 and heat exchanger 17. Pump 14 circulates solution during the reaction as indicated in FIG. 1 such that there is continuous mixing during the reaction process. Heat exchanger 17 provides cooling and/or heating during the reaction process to insure that the reaction temperature is maintained within proper limits. More specifically, heat exchanger 17 is used to provide cooling where the reaction is exothermic and to provide heating when the reaction is endothermic. A cooling or heating medium 16 such as water or steam is used as required.

Water source 18 and caustic source 19 provide for water and caustic, respectively and are each capable of being monitored for predetermined amounts. The apparatus also includes hydrometer 21 positioned such that the specific gravity of the reaction mixture can be determined at any time during the reaction process. Preferably, water source 18 is connected to hydrometer 21 such that water may be automatically added to the mixture if the specific gravity of the reaction mixture exceeds a predetermined amount at any given time.

In accordance with the present invention, the method of manufacture for aqueous hydrides is as follows. Metal pieces 22 are added to tank 11. Preferably, metal pieces 22 are in the form of chunks or lumps and fill about ⅓ of tank 11. The amount of metal 22 used is not critical so long as at least twice the amount of metal required to obtain a predetermined amount of reaction product is utilized. While the size of metal pieces 22 is not critical, chunks which are too wide such as greater than about 2" tend to cause hydrolic or flow problems. In addition, the use of chunks which are less than about ½ cause the reaction to proceed too quickly due in part to the increased surface area for reaction, thus preventing the external cooling to slow the reaction appropriately. Similarly, the use of metal fines rather than chunks of metal cause the reaction to proceed too quickly and the reaction temperature exceeds preset values. Thus, hot zones of rapidly reacting material must be minimized. This should be avoided since formation of silicates occurs when the reaction proceeds too quickly.

Various metals are suitable for use in accordance with the present invention. The metal must be capable of being attacked or reacting with a caustic. For example, and not intended to be limiting, non-corrosive resistant metals such as silicon, zinc, aluminum, beryllium, tin, iron and mixtures thereof are suitable for use in accordance with the present invention. In a preferred embodiment, zinc is used while in another preferred embodiment, silicon is the metal used. However, a mixture of zinc and silicon may be combined as the metal component of the reaction mixture, thus allowing for the formation of hybrid metallic-polysilicate solutions.

Figure 2:
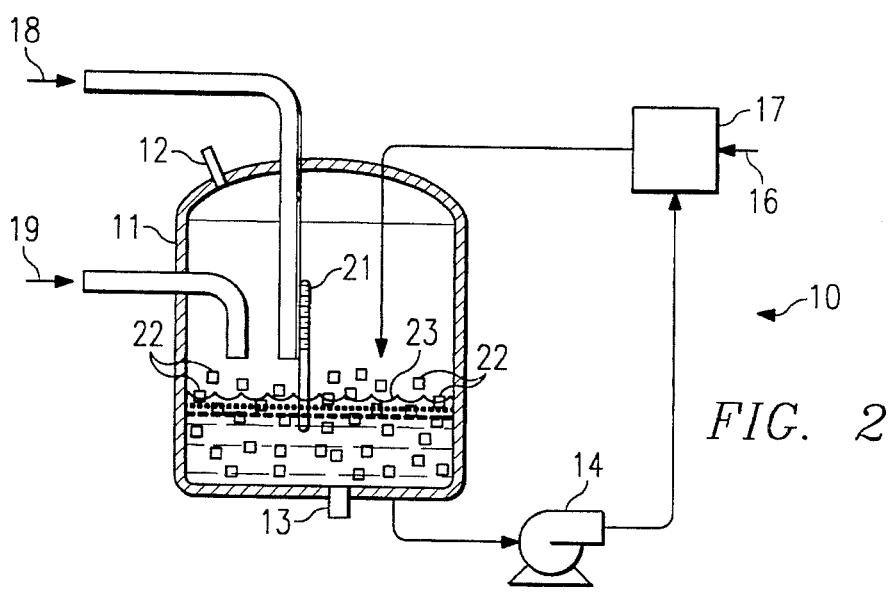
FIG. 2 illustrates the apparatus of FIG. 1 and includes water in contact with the metal pieces.

Reference is had to FIG. 2, which is the same as FIG. 1 except that a predetermined amount of water 23 has been added to tank 11. Water 23 is in contact with metal 22 and in the most preferred embodiment, water 23 is immersed in metal 22 such that all of water 23 is below the top surface of metal 22. The amount of water is not critical so long as there is a presence of excess metal in the tank.

Figure 3:
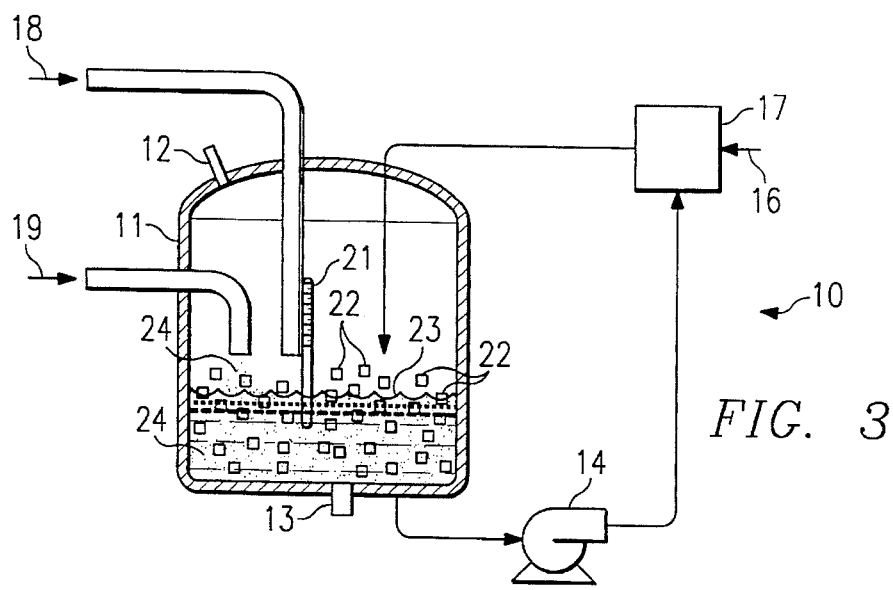
FIG. 3 illustrates the apparatus of FIGS. 1 and 2 and further includes caustic being deposited in the apparatus.

FIG. 3 is the same as FIG. 2 except that a predetermined amount of caustic or alkali hydroxide 24 has been added to tank 11. As illustrated in FIG. 3, caustic 24 may be in the form of pellets. Caustic in the form of pellets provides a heat of reaction in the water. However, caustic in the form of pellets is costly and thus it is preferable to use caustic in the liquid form. As discussed herein, external heat or heat given off from the use of silicon fines may be used with the liquid caustic to provide a more economical, yet efficient, process.

Suitable caustics or alkali hydroxides for use in accordance with the invention include, but are not limited to, sodium hydroxide, potassium hydroxide and lithium hydroxide. However, due to economics, sodium hydroxide is the preferred caustic followed by potassium hydroxide and then lithium hydroxide.

The amount of caustic used is predetermined based on the desired amount of product. Approximately ½ of the predetermined amount of caustic 24 is added to tank 11. After about an hour, the remaining half of caustic 24 is added gradually to the reaction mixture such that when the metal, water and caustic are present in the tank, the caustic accounts for approximately 25–40% by weight of the mixture. At this point, the viscosity of the mixture will have a specific gravity of about 1.3–1.35.

In order to initiate the reaction quicker, fines may be added to the mixture. The fines may be added regardless of the metal used and in cases where the reaction is exothermic in nature. In a preferred embodiment, silicon fines are used to form polysilicates. In such case, the addition of silicon fines is monitored and continued until the reaction begins to accelerate. This typically occurs when there is a 10° C. increase in a period of 5 minutes or less. Once the reaction reaches this point, no additional silicon fines are added. To do so would cause the reaction to proceed uncontrollably. This is critical since silicates form when the reaction proceeds too quickly. If the reaction does begin to proceed at such a rate, external cooling should be applied immediately by heat exchanger 17 or some other method of cooling to bring the reaction back under control.

When silicon is used as the metal and caustic 24 is added to the silicon and water, silicon fines are also added to initiate the reaction. The reaction mixture then begins to foam and the temperature begins to increase due to the exothermic nature of the reaction. No further silicon fines are added once the reaction accelerates as mentioned above. When the temperature reaches about 75°–80° C., external cooling is applied to the reaction mixture to slow the rate of reaction, thereby preventing the temperature from exceeding 90°–100° C. and forming silicates. From this point, it will take about 15–20 minutes to reach the reaction temperature of about 90° C.

Conversely, when zinc is the metal used, the reaction is endothermic in nature of the reaction. Silicon fines are used to accelerate the rate of reaction as discussed above. Once the reaction has been accelerated to a point where the temperature increases about 10° C. in 5 minutes or less, no additional silicon fines are added. However, external heating may be required to achieve and maintain the 90°–100° C. reaction temperature.

As mentioned previously, temperature control is critical in the present invention. It has been found that the preferred temperature during the reaction process is about 90° C.–100° C. and more preferably about 90° C. Temperatures exceeding this range are more likely to form silicates. In the case of an exothermic reaction, it may be necessary to cool the reaction mixture. This can be accomplished by the use of a cooling tower, heat exchanger or the like. In this manner, the reaction temperature is maintained at approximately 90° C.

Similarly, the reaction temperature of an endothermic reaction should be maintained at 90° C.–100° C. and may therefore require heat as stated above. The addition of heat may be accomplished in a variety of ways. For example, water 23 may be heated prior to being added to tank 11. Alternatively, external heat from a heat exchanger may be used to control the reaction temperature.

The reaction should be allowed to proceed until completion. While time is not critical in that allowing the process to continue after having gone to completion will not result in the formation of silicates, it is critical in that the reaction must be allowed to proceed long enough to go to completion. Accordingly, since the reaction time is dependent on the metal used, a reaction time is determined for each metal and a safety factor is then added to insure that it has gone to completion. Determining the reaction time for each metal may be accomplished as follows:

A batch is prepared and the reaction is allowed to proceed as described above. Samples are drawn and the amount of metal in solution is measured periodically during the reaction. When a steady state reaction occurs, saturation has been achieved and the amount of metal in solution remains fairly constant. This is then used as the reaction time or time required for the reaction to proceed to completion. A safety factor is then added to this time period. This process may be determined for each metal used. However, it has been found that allowing the reaction to proceed for about 10–12 hours is typically more than satisfactory. Certain metals such as aluminum are known to react quicker with a caustic such as sodium hydroxide than other metals such as zinc. Accordingly, the reaction will proceed to completion at a quicker rate in such instances.

The initial specific gravity of the mixture is about 1.3–1.35. This is in part due to the high concentration of caustic. As the reaction proceeds, the mixture becomes more viscous. Once the specific gravity reaches about 1.6–1.7, it is maintained constant. If the specific gravity exceeds this range, water may be added to dilute the viscosity of the mixture. It should be noted that starting the reaction with a concentration of caustic at less than 25% by weight results in a mixture with a specific gravity which is too low during the reaction stage, thereby resulting in the formation of silicates.

As the reaction begins to slow, the temperature should continue to be maintained at 90° C. This may require the gradual decrease of any external cooling in an exothermic reaction. After all external cooling is removed, the reaction is then allowed to cool to about 50°–60° C. by conduction and convection while the specific gravity of the mixture is maintained constant at 1.6–1.7. The reaction product may then be separated from any unreacted materials through drain 13 and processed for shipping or storage.

Alternatively, the reaction product may be diluted with water to a specific gravity of about 1.3 and then drained. While this latter method is more costly due to increased shipping and storage, the product is then ready for use. Dilution of the mixture should not be done until the reaction is complete or at a temperature of about 50°–60° C. If the mixture is diluted to a specific gravity of about 1.3 while the reaction is still proceeding, hydrolysis will occur and silicates may form. Similarly, the more the reaction product is diluted even after the reaction is completed, the more likely a hydrolysis reaction will occur, forming silicates and reducing shelf life. It is therefore beneficial to ship the product with a specific gravity of about 1.6–1.7 rather than 1.3 since it is less expensive, extends the shelf life of the product and reduces the risk of hydrolysis from occurring.

Approximately ½ of the metal will remain in tank 11 after the reaction product is removed. Additional metal may then be added to the tank and a new batch will be ready for manufacture. In this manner, it is possible to achieve the manufacture of metal compounds in solution, but without the necessity of combining stoichiometric amounts of metal, alkaline metal hydroxide and water in preselected proportions by mole percent. This is particularly advantageous under manufacturing conditions where it is often difficult or time consuming to precisely measure precise stoichiometric mole percentages.

Metal compounds produced in accordance with the present invention are superior to those produced by prior art techniques in that such compounds exhibit increased stability in solution, are less likely to hydrolyze and form silicates, exhibit polymer characteristics and possess a longer shelf life than aqueous hydrides produced in accordance with prior art techniques.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method of manufacturing aqueous hydrides, comprising the steps of:

placing in a tank at least twice an amount of metal required to produce a predetermined amount of reaction product;

introducing a predetermined quantity of water into the tank in such a manner as to provide intimate contact with the metal;

gradually adding a predetermined amount of an alkali hydroxide to the metal and water, thereby forming a reaction mixture and initiating a reaction, wherein the alkali hydroxide comprises a portion of the reaction mixture in the range of 25–40% by weight;

maintaining a temperature of the reaction mixture in a range of 90°–100° C. and a specific gravity of the reaction mixture in a range of 1.6–1.7 until the reaction goes to completion; and cooling the reaction mixture to a temperature of approximately 50°–60° C. to form an aqueous hydride having a specific gravity in a range of 1.6–1.7 after cooling of the reaction mixture.

2. The method of manufacturing as described in claim 1 further comprising the step of diluting the cooled reaction mixture with additional water to obtain a final product having a specific gravity of about 1.3.

3. The method of manufacturing as described in claim 1 wherein the metal is selected from the group consisting of silicon, aluminum, beryllium, iron, zinc, tin and mixtures thereof.

4. The method of manufacturing as described in claim 1 wherein the metal is silicon.

5. The method of manufacturing as described in claim 4 wherein the silicon is in the form of chunks.

6. The method of manufacturing as described in claim 1 wherein the metal is zinc.

7. The method of manufacturing as described in claim 6 wherein the zinc is in the form of chunks.

8. The method of manufacturing as described in claim 1 wherein the alkali hydroxide is selected from the group consisting of sodium hydroxide, potassium hydroxide and lithium hydroxide.

9. The method of manufacturing as described in claim 1 wherein the alkali hydroxide is sodium hydroxide.

10. The method of manufacturing as described in claim 1 wherein the step of maintaining the reaction temperature includes heating the water prior to introducing the water into the reaction mixture.

11. The method of manufacturing as described in claim 1, wherein the step of maintaining the specific gravity in a range of about 1.6–1.7 includes adding water to the reaction mixture.

12. A method of manufacturing aqueous hydrides, comprising the steps of:

placing in a tank at least twice an amount of silicon chunks required to produce a predetermined amount of reaction product;

introducing a predetermined amount of water into the tank in such a manner that the water is below the level of silicon chunks;

gradually adding a predetermined amount of sodium hydroxide to the metal and water, thereby forming a reaction mixture, wherein the alkali hydroxide comprises a portion of the reaction mixture in the range of 25–40% by weight;

initiating a reaction by adding silicon fines to the reaction mixture until a temperature increase of approximately 10° C. occurs in 5 minutes or less;

maintaining a temperature of the reaction mixture in a range of 90°–100° C. and a specific gravity of the reaction mixture in a range of 1.6–1.7 until the reaction goes to completion; and cooling the reaction mixture to a temperature of about 50°–60° C., to form an aqueous hydride having a specific gravity in a range of 1.6–1.7 after cooling of the mixture.

* * * * *